(12) United States Patent
Lu et al.

(10) Patent No.: US 6,473,815 B1
(45) Date of Patent: Oct. 29, 2002

(54) QUEUE SHARING

(75) Inventors: Xiaolin Lu, Middletown, NJ (US); Min Zhu, Santa Cruz, CA (US)

(73) Assignee: AT&T Corporation, New York, NY (US)

(*) Notice: Subject to any disclaimer, the term of this patent is extended or adjusted under 35 U.S.C. 154(b) by 0 days.

(21) Appl. No.: 09/416,418

(22) Filed: Oct. 12, 1999

(51) Int. Cl.[7] .............................................. G06F 13/14
(52) U.S. Cl. ........................ 710/52; 710/126; 710/56; 370/402
(58) Field of Search ........................ 710/56, 52, 126; 370/402

(56) References Cited

U.S. PATENT DOCUMENTS

| | | | |
|---|---|---|---|
| 4,703,449 A | * 10/1987 | Berman | 364/900 |
| 4,888,739 A | * 12/1989 | Frederick et al. | 365/221 |
| 5,163,132 A | * 11/1992 | Dulac et al. | 395/275 |
| 6,055,590 A | * 4/2000 | Pettey et al. | 710/56 |

* cited by examiner

Primary Examiner—Jeffrey Gaffin
Assistant Examiner—Abdelmoniem Elamin
(74) Attorney, Agent, or Firm—Oliff & Berridge, PLC (57) ABSTRACT

This invention provides queue sharing methods and apparatus of a queuing system which includes queues of multiple priorities or classes. When data is received in a class queue, for example, and the class queue is full, the queue is in an overflow condition and the data is overflow data. The queue sharing apparatus processes the overflow data by determining whether the overflow data may be placed in one of the other class queues which are not full. If higher class queues have higher performances than lower class queues, then when lower class queues are full, overflow data of the lower class queues may be placed in higher class queues without performance penalties. When higher class queues are full, the overflow data from the higher class queues may be placed in lower class queues. However, in this situation, a higher class buffer threshold is generated for the lower class queue to indicate when the higher class performance may be compromised.

16 Claims, 8 Drawing Sheets

QUEUE SHARING

BACKGROUND OF THE INVENTION

1. Field of Invention

This invention relates to methods and apparatus for queue sharing.

2. Description of Related Art

Data transmitted in a network is often placed in a serial queue for routing and forwarding. When the queue is full, new data cannot be received until data already in the queue is transferred out. Thus, data transfer rated is limited by the size of a particular queue. Accordingly, new technology is needed.

SUMMARY OF THE INVENTION

This invention provides queue sharing methods and apparatus of a queuing system which includes queues of multiple priorities or classes. When data is received for a class queue and the class queue is full because the class queue cannot meet required performance for the data due to conditions such as memory full, buffer threshold exceeded, unacceptable transmission delay or quality, for example, then the queue is in an overflow condition and the data is overflow data. The queue sharing apparatus processes the overflow data by determining whether the overflow data may be placed in one of the other class queues which are not full or whether the overflow data should be dropped.

Class queues may be ordered from low class to high class. Assuming that higher class queues have higher performance requirements such as bandwidths, end-to-end delay, transmission quality, etc., than lower class queues, then, when lower class queues are full, lower class overflow data may be placed in higher class queues until the higher class queues are full without performance penalty. When higher class queues are full, overflow data from the higher class queues may also be placed in lower class queues. However, to maintain higher class performances, a higher class threshold may be generated for each lower class queue so that if the lower class queue cannot meet a corresponding higher class threshold, the lower class queue is considered full with respect to the higher class data.

If higher class data is placed in a lower class queue and the higher class threshold cannot be met, a decision is made whether the higher class data may be transmitted at below the required performance. If a reduction of the higher class performance is not acceptable, the overflow high class data may be dropped or deleted, for example. Dropping data reduces the quality of the transmission but maintains the bandwidth. Thus, the invention optimizes the utilization of class queues with minimum impact on queue performance such as transmission bandwidth.

BRIEF DESCRIPTION OF THE DRAWINGS

The invention is described in detail with reference to the following figures, wherein like numerals reference like elements, and wherein.

DETAILED DESCRIPTION OF PREFERRED EMBODIMENTS

This invention provides queue sharing methods and apparatus for a queuing system that controls data transmission via priorities or classes. For example, in a network environment having high, medium, and low classes, each of the classes may be associated with a unique queue. When new data is received and a queue is full, queue sharing steers the data (overflow data) to another queue (which is not full) without compromising the performance requirements of the other queue. The queue full condition may be defined as a condition when the queue cannot meet performance requirements for that data such as when a buffer threshold, that indicates either a physical memory is exhausted or a specified boundary is reached, is exceeded or transmission quality such as end-to-end delay may be below a delay threshold.

For example, if a high class queue is full, then queue sharing may place overflow high class data in a medium class queue if such an action does not jeopardize the performance of the medium class data. Thus, queue sharing maximizes queue utilization while ensuring that data transmission requirements for each of the classes are met.

The queue full condition may be determined based on current conditions surrounding the queue. For example, buffer thresholds, when exceeded, may indicate a full condition. In this case, data in the queue that exceeds the buffer threshold may experience unacceptable delay because data earlier in the queue may not be transmitted out of the queue in time to meet queue delay requirements for the data.

The queue full condition may be based on head, tail or other intermediate queue position packet delay. For example, if data packets are used, the queue stores a chronological sequence of data packets. The first data packet of the sequence is the head data packet and the last data packet is the tail data packet. The time difference between when the data packet reached the head or tail position and the time that the data packet reaches the final destination may be defined as the head or tail packet delay this delay may be estimated based on network congestion conditions, virtual or actual paths and/or actual measured data packet delay that may be reported by the final destination device based on time stamps in data packet headers. Thus, if the head packet delay, as estimated by one or more of the above or other techniques, exceeds a delay threshold, then the queue is considered full.

Figure 1:
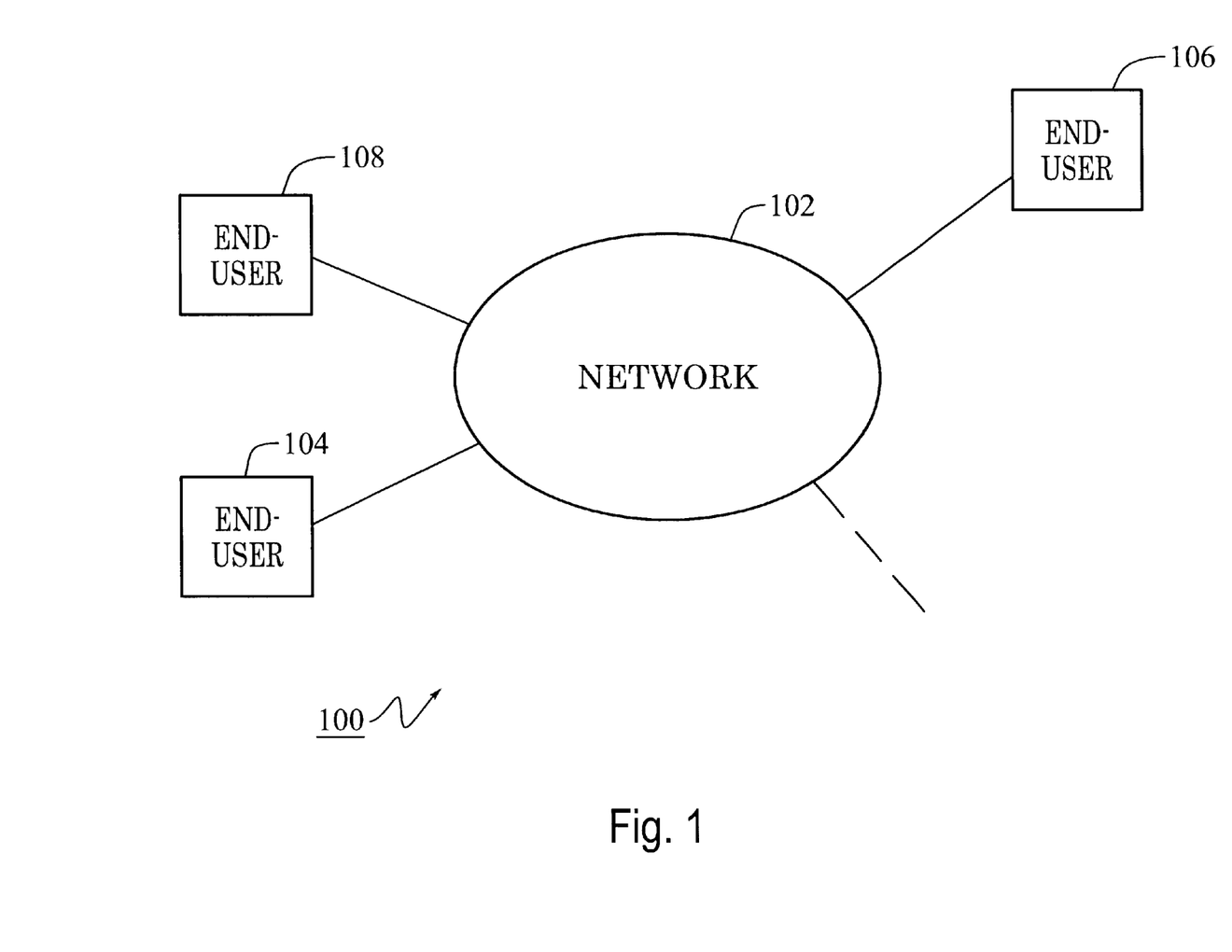
FIG. 1 is an exemplary diagram of a communication network.

FIG. 1 shows an exemplary diagram of a communications system 100 that includes a network 102 and end-users 104–108. The network 102 may be a telecommunication network, a data network or any of a variety of intra or internets that facilitates communication among end-users. The end-users 104–108 may be a terminal, a telephone station (wire or wireless) or other communication systems such as PBXs, for example.

When end-users 104–108 desire to communicate, each of the end-users 104–108 sends communication signals through the network 102 in the form of data packets, for example. Data packets are not required but are convenient for discussion purposes. Each of the data packets are received by the network 102 and placed into queues awaiting available network resources to complete the communication.

Figure 2:
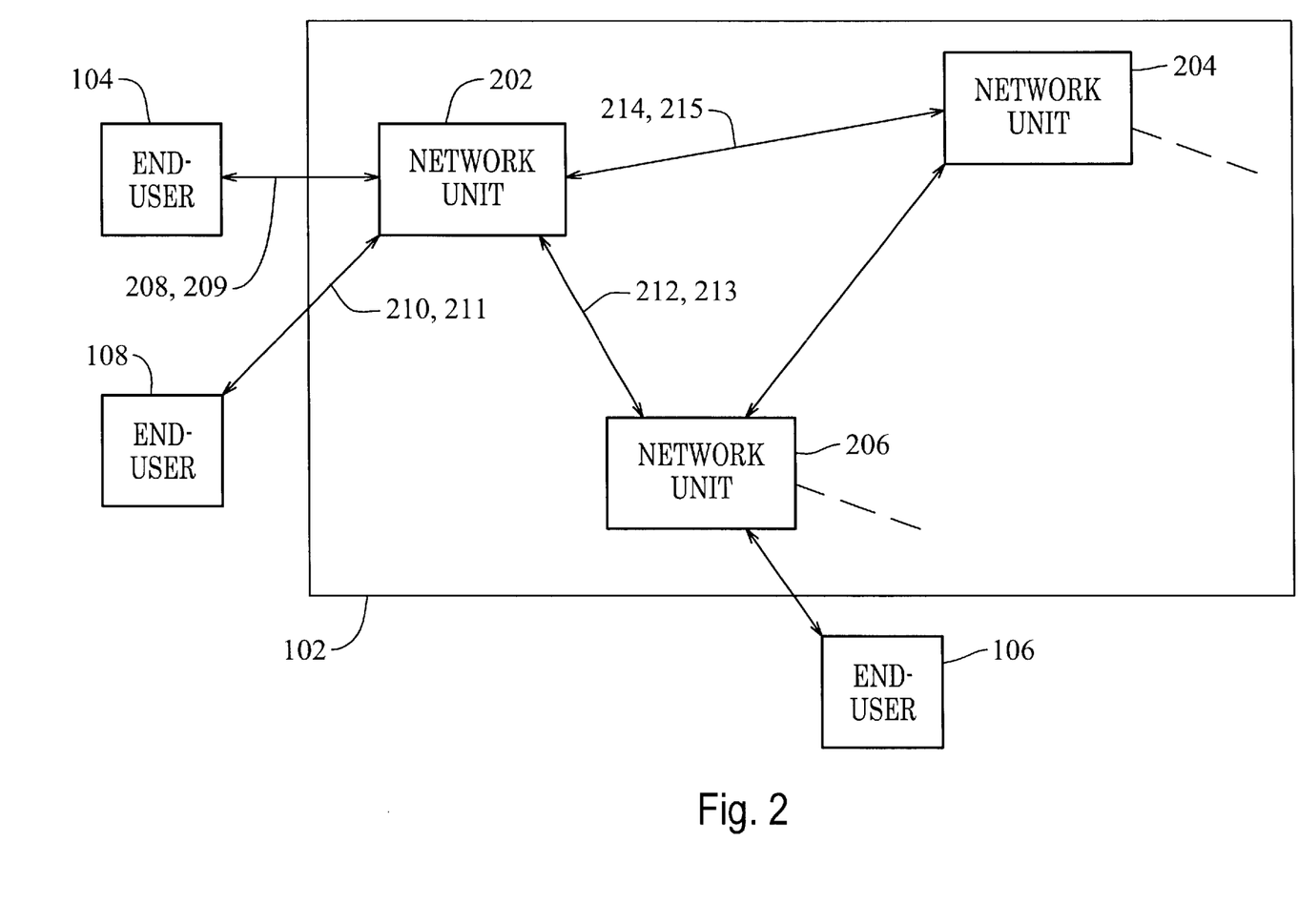
FIG. 2 is an exemplary diagram of the network in FIG. 1 with further detail.

FIG. 2 shows an exemplary diagram of the network 102 which includes network units 202–206. The network unit 202 is coupled to the end-user 104 via communication links 208 and 209; the end-user 108 via communication links 210 and 211; network unit 204 via communication link 214 and 215; and network unit 206 via communication links 212 and 213. The communication links 208, 210, 212 and 214 are input into the network unit 202, and the communication links 209, 211, 213 and 215 are output from the network unit 202. From the perspective of the network unit 202, data packets are received from the communication links 208, 210, 212 and 214 and each of the received data packets is destined to one of the end-users 104 and 108 and the network units 204 and 206.

Figure 3:
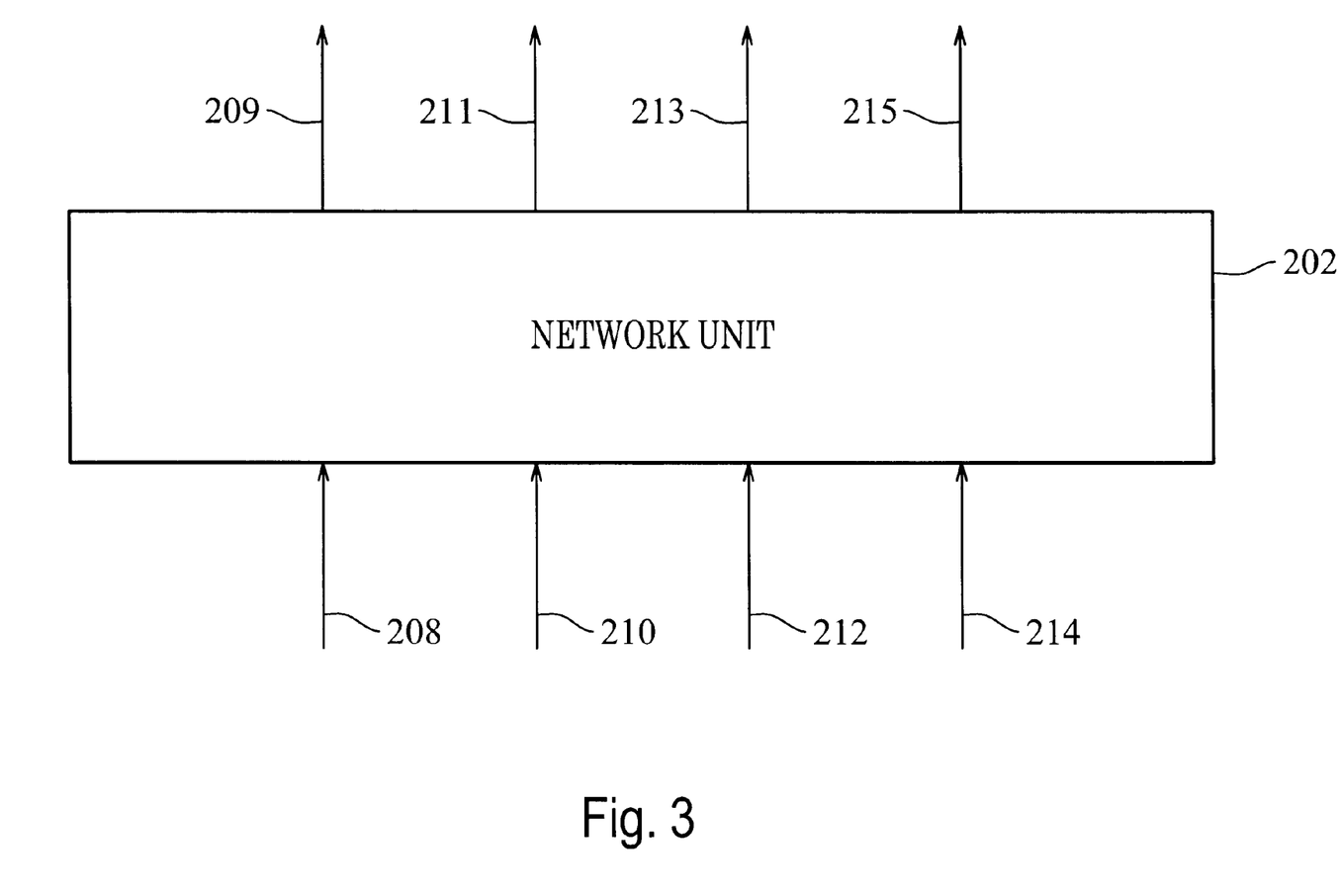
FIG. 3 is an exemplary block diagram of a network unit.

As an example, the network unit 202 is illustrated in FIG. 3, where the links 208, 210, 212 and 214 are input into the network unit 202, and the links 209, 211, 213 and 215 are output from the network unit 202. Data packets that are sent via the communication links 209, 211, 213 and 215 are destined for the end-users 104 and 108 and the network units 204 and 206, respectively.

The network unit 202 places data packets received from the links 208, 210, 212 and 214 into input queues so that a switch, for example, within the network unit 202 may route each of the data packets to the proper destinations corresponding to the links 209, 211, 213 and 215. Each of the links 209, 211, 213 and 215 are provided with output queues that receive the data packets from the input queues for outputting through respective ports corresponding to the links 209, 211, 213 and 215 to the respective end-users 104 and 108 and the network units 204 and 206.

Figure 4:
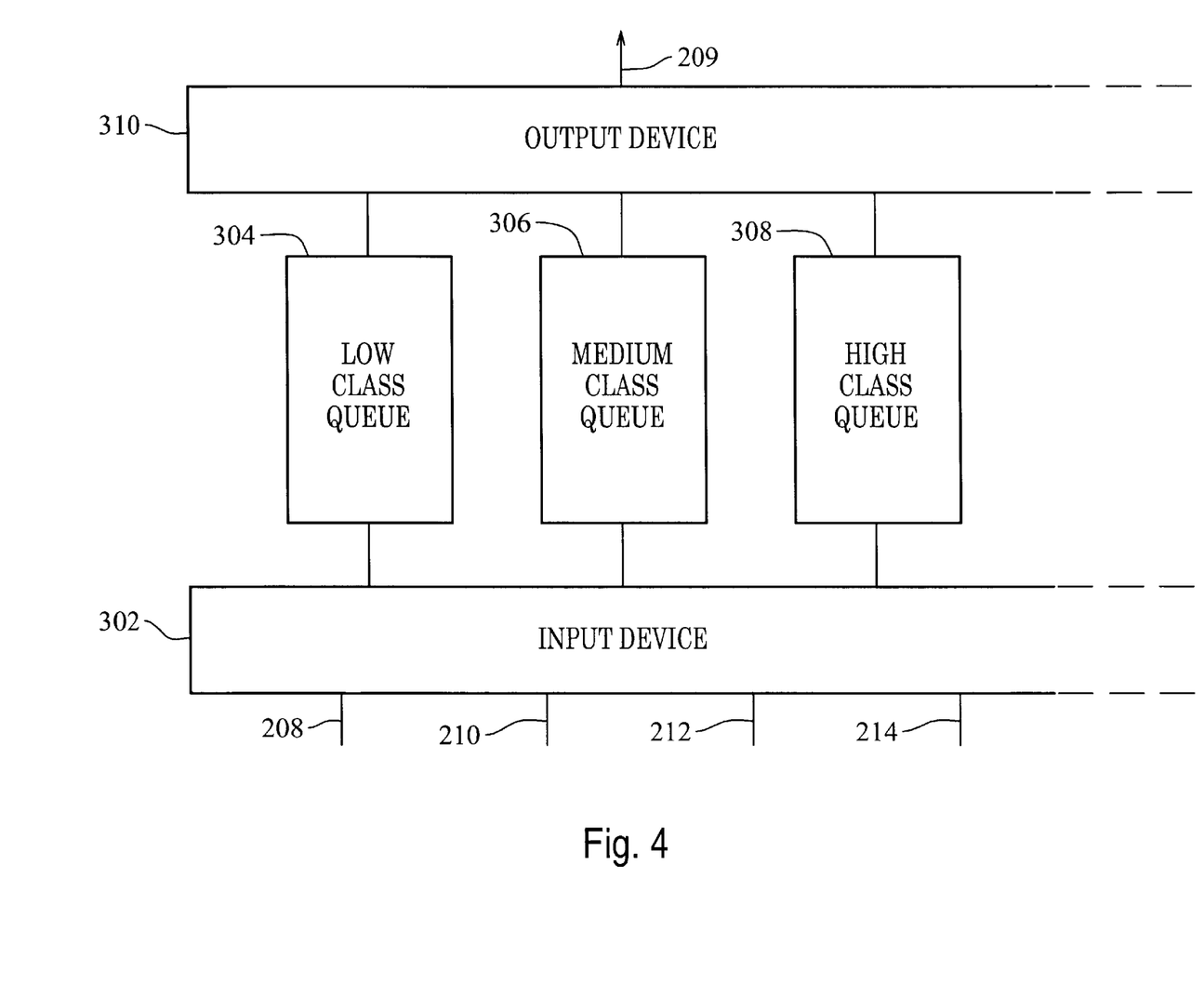
FIG. 4 is an exemplary diagram of high, medium and low class queues.

FIG. 4 shows an exemplary block diagram of a queue sharing apparatus 300 of the network unit 202 for transferring data packets from the links 208, 210, 212 and 214 to a port 310 connected to the link 209. The queue sharing apparatus 300 may include an input device 302 that receives data packets from the links 208, 210, 212 and 214 destined for the link 209 and forwards the received data packets to the appropriate ones of the high, medium or low class queues 308, 306 and 304. The data packets are then transferred from the high, medium and low class queues 308, 306 and 304 to the output device 310 which in turn outputs the data packets to the port 310.

The following discussion uses bandwidth as a transmission quality of interest by way of example. Other performance parameters such as end-to-end delay may also be used as mentioned above.

The total bandwidth supported by the link 209 may be allocated to each of the high, medium and low classes by using a weight based scheduling technique where a weight is associated with each of the classes. Each weight may specify how often data packets from an associated queue is transferred to the output device 310. For example, assume that the weights are: high class=5; medium class=2; and low class=1, then five data packets from the high class queue 308 are transferred for two data packets from the medium class queue 306 and one data packet of the low class queue 304.

The weight based scheduling technique may operate in cycles where for each cycle, a number of data packets proportional to the corresponding weight is transferred from each queue. Thus, for each cycle in the above example, five data packets from the high class queue 308 is transferred, two data packets from the medium class queue 306 are transferred and one data packet from the low class queue 304 are transferred. The data packet transfers are illustrated in Table 1 below where columns are labeled with the high, medium and low class queues 308–304 and the rows are labeled in the first column by cycles.

TABLE 1

|   | High  | Medium | Low |
|---|-------|--------|-----|
| 1 | 1–5   | 6, 7   | 8   |
| 2 | 9–13  | 14, 15 | 16  |
| 3 | 17–21 | 22, 23 | 24  |
| 4 | 25–29 | 30–31  | 32  |
|   | .     | .      | .   |
|   | .     | .      | .   |
|   | .     | .      | .   |

The high class does not necessarily have a higher bandwidth than lower classes because bandwidth allocation may also account for a number of end-users in a particular class. For example, the high class bandwidth may be only 20% of the bandwidth of the lower class but the number of high class subscribers may be only 1% of the number of low class subscribers. Thus, while the allocated bandwidth for the high class may be lower than that for the low class, the effective bandwidth for the high class data volume is much higher than for the low class. The effective bandwidth may be related to service quality of a particular user which may also be related to end-to-end delay, for example. For simplicity of discussion below, it is assumed that bandwidth and effective bandwidth are the same.

Queue sharing is described below using buffer thresholds as a specific example. However, other performance thresholds may be substituted such as head packet delay threshold or tail packet delay threshold, for example. Thus, the buffer thresholds may be replaced with head or tail packet delay thresholds in the following discussion.

Figure 5:
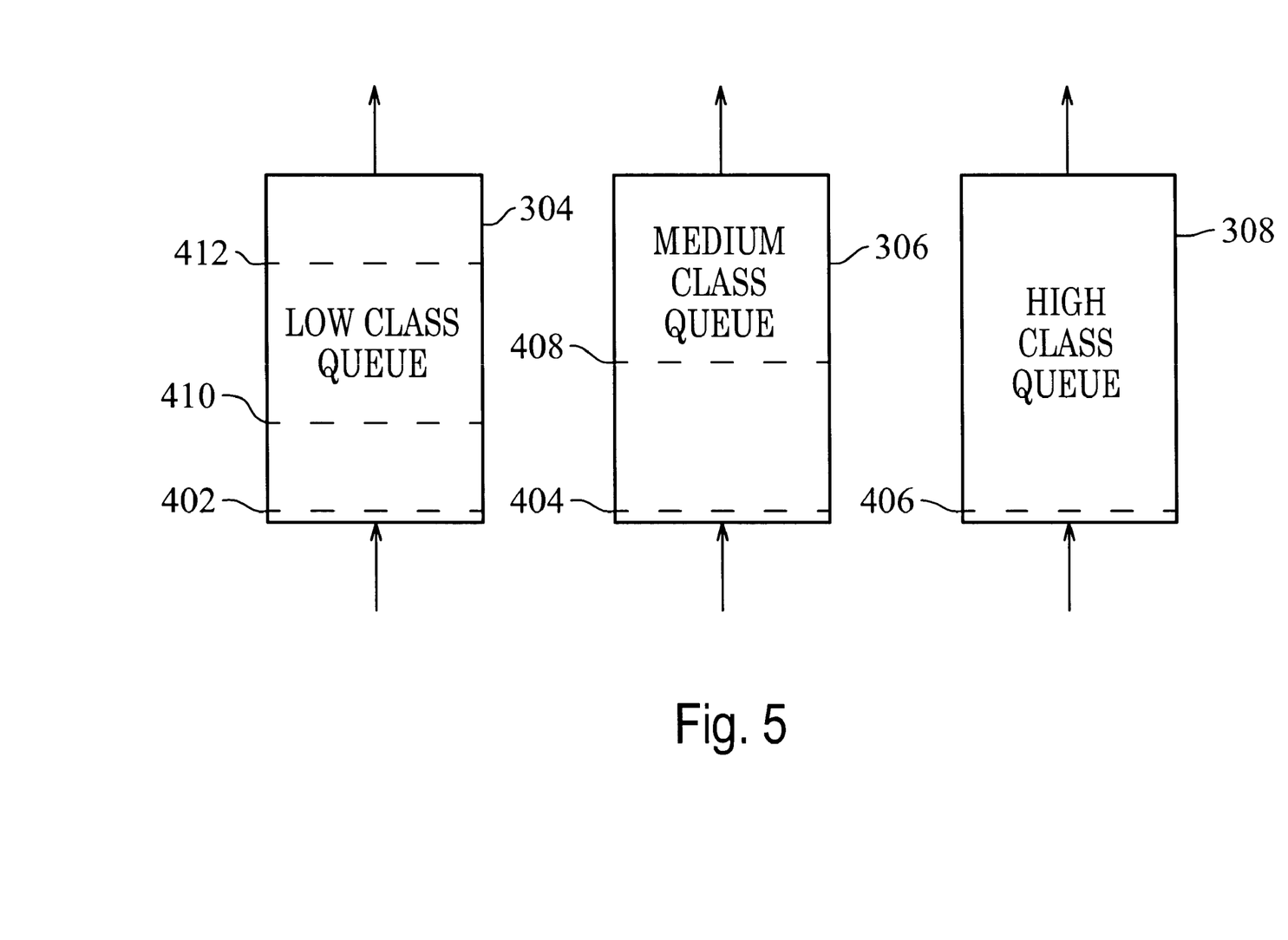
FIG. 5 is an exemplary diagram of buffer thresholds of the queues shown in FIG. 4.

FIG. 5 shows buffer thresholds 406, 404 and 402 corresponding to the high, medium and low class queues 308, 306 and 304 respectively. A buffer threshold is a maximum number of data packets that may be stored in each of the queues 308–304 before the respective queues 308–304 are considered full and thus, corrective action may be required. The buffer threshold may simply be the available memory size or may be a specified boundary that is set below the memory size limitation to detect a "full" condition.

When the number of data packets within each of the queues 308–304 is equal to the respective buffer thresholds 406–402, the queue is in a full condition and new data packets, which are now overflow data packets, cannot be added to the queue 308–304 either because no memory space remains or performance pre-specified for that queue may be degraded. Thus, in order to guarantee that the high class bandwidth is equal to or greater than a high class pre-specified bandwidth $bw_H$, the overflow data packets must be dropped or otherwise handled if the high class queue 308 is full. Dropping data packets directly degrades transmission quality and is undesirable. Thus, the queue sharing apparatus 300 avoids dropping data packets by utilizing the bandwidths of other class queues, if available, to avoid degradation of performance in either quality of transmission or transmission bandwidth.

When a lower class queue is full and a higher class queue is not full, the lower class overflow data packets may be placed in the higher class queues. For example, if the low class queue 304 is full and the medium class queue 306 is not full, then a low class overflow data packet may be placed in the medium class queue 306 without penalizing the medium class bandwidth and at the same time not degrade the quality of the low class transmission. If the medium class queue 306 is also full and the high class queue 308 is not full, then the low class data packet may be placed in the high class queue 308. Similarly, if the medium class queue 306 is full and the high class queue 308 is not full, then medium class overflow data packets may be placed in the high class queue 308 without compromising either the high class bandwidth or the medium class transmission quality.

If the high class queue 308 is full and the medium class queue 306 is not full, then high class overflow data packets may be placed in the medium class queue 306. However, the high class overflow data packet may experience a lower bandwidth because the medium class bandwidth is less than the high class bandwidth. Thus, to ensure that the high class bandwidth is maintained, high class buffer thresholds 408 and 412 are established for the medium and low class queues, respectively, so that the medium and low class queues 306 and 304 are considered full with respect to high class overflow data packets if the number of data packets in the medium and low class queues 306 and 304 exceed the respective high class buffer thresholds 408 and 412. If all lower class queues are full with respect to high class overflow data, then the high class overflow data cannot be placed into the lower class queues without compromising high class bandwidth. In this case, the overflow data may be dropped to protect the high class bandwidth. The lower class data may continue to be placed in the respective queues until the corresponding buffer thresholds are exceeded.

Similarly, a medium class buffer threshold 410 is established for the low class queue 304 so that medium class overflow data packets cannot be placed in the low class queue 304, if the number of data packets in the low class queue exceeds the medium class buffer threshold 410 (without possible bandwidth penalty). In this way, the bandwidth requirements for each of the respective classes are maintained even though overflow data packets of higher classes are placed in lower class queues.

The buffer thresholds for each of the class queues may be set to a value that is inversely proportional to the bandwidth corresponding to each of the class queues. Thus, the high class upper threshold ($bt_H$) 406 may be proportional to $1/bw_H$, the medium class buffer threshold ($bt_M$) 404 may be proportional to $1/bw_M$, and the low class buffer threshold ($bt_L$) 402 may be proportional to $1/bw_L$, where $bw_H$, $bw_M$ and $bw_L$ are high, medium and low class bandwidths, respectively.

Intuitively, the value of the buffer threshold decreases as the bandwidth increases. Thus, for a high bandwidth transmission, the buffer threshold value is small limiting the number of data packets waiting to be transferred in the queue to a small value so that a small queue delay is experienced. On the other hand, if the bandwidth value is small, the buffer threshold value is large so that a larger number of data packets may be stored in the queue and, consequently a larger queue delay is experienced.

The buffer thresholds 408–412 for higher class data in the lower class queues may be set to values that are proportional to a ratio of effective bandwidths that correspond to the respective queues. For example, the high class buffer threshold for the low class queue may be proportional to eff $bw_L$/eff $bw_H$, where eff $bw_L$ and eff $bw_H$ are effective bandwidths which correspond to the low and the high class, respectively.

When queue full conditions occur, the queue sharing apparatus 300 may simply place an overflow data packet in the lowest class queue possible. For example, if the high class queue 308 is full, the queue sharing apparatus 300 may first attempt to place a high class overflow data packet in the low class queue 304 and, if the number of data packets in the low class queue exceeds the high class queue buffer threshold 412, then the queue sharing apparatus 300 may attempt to place the high class overflow data packet in the medium class queue 306.

If the low class queue 304 is full, the queue sharing apparatus 300 may attempt to place a low class overflow data packet in the medium class queue 306 first before attempting to place the low class overflow data packet in the high class queue 308. In this way, the higher class queues are provided a measure of protection from lower class congestion conditions.

Figure 6:
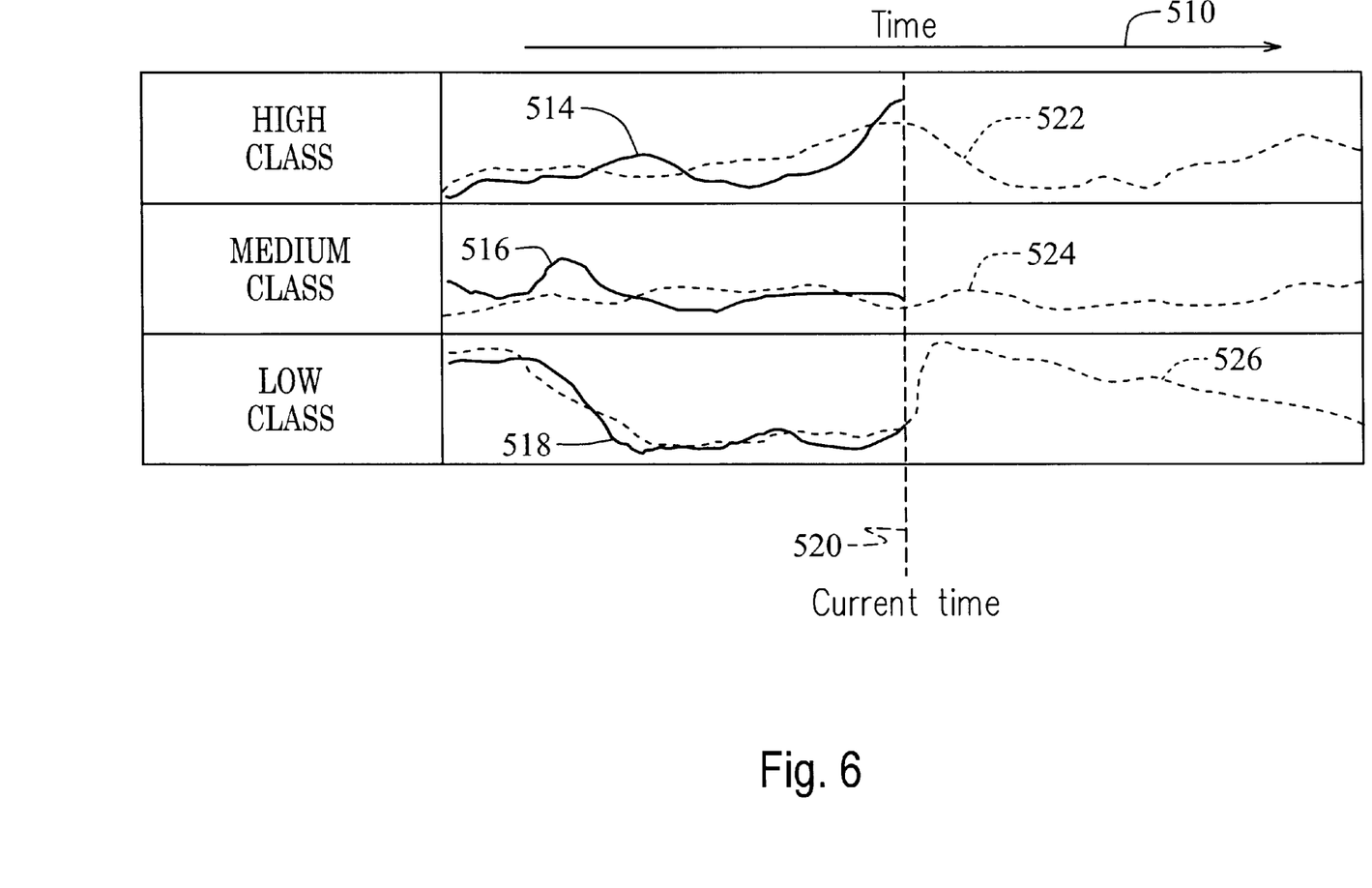
FIG. 6 is an exemplary diagram of data volume verses time for each of the queues.

The queue sharing apparatus 300 may also place overflow data packets into non-full queues based on historical traffic volume for each of the class queues. For example, the queue sharing apparatus 300 may maintain data packet volumes for the high, medium and low classes. Data packet volume data is shown in FIG. 6 where time increases from left to right as shown by the arrow 510. Data packet volumes are shown by solid curves 514–518 and historical data packet volumes are shown by dash lines 522–526. The current time is indicated by the vertical dash line 520.

The queue sharing apparatus 300 may choose to place high class overflow data packets into the medium class queue 306 rather than the low class queue 304 based on the data packet volume data shown in FIG. 6, because the low class data packet volume 518 appears to be following along the historical data volume pattern 526 which predicts a sudden rise in data packet volume in the near future. Thus, the queue sharing apparatus 300 may place high class overflow data packets into the medium class queue 306 instead of the low class queue 304.

While the above discussion focuses on buffer thresholds and placing the newest data packet as overflow packets in other class queues, queue sharing may move data packets that are in between the head and tail packets to other class queues when other than buffer thresholds are used. For example, if tail packet delay is used and the tail delay exceeds a tail delay threshold, then several data packets from the queue may be moved together with the newest data packet to ensure that the tail delay requirement is met.

In addition, a performance requirement may specify that all data packets must arrive at the destination in packet transmission order. Such a requirement may be met if the virtual path for all the data packets are the same. However, if under this requirement, the tail packet delay requirement is being compromised, then queue sharing will attempt to move data packets to another class queue. However, before the move can be made, a determination must be made to ensure that the data packet transfer rate of the other queue will not upset the packet receive order at the destination device. Thus, if data packet transfer rate is higher in the other queue than the data packet transfer rate of the original queue, then a data packet closer to the head packet is moved instead of the newest data packet so that the arrival time of the moved data packet will most likely appear in the proper order compared to other data packets that was transmitted before and after the moved data packet. This data packet may be identified by estimating the packet transfer delay based on the network architecture, estimated delay and actual data packet transfer delay information obtained as data packets are being transferred.

Figure 7:
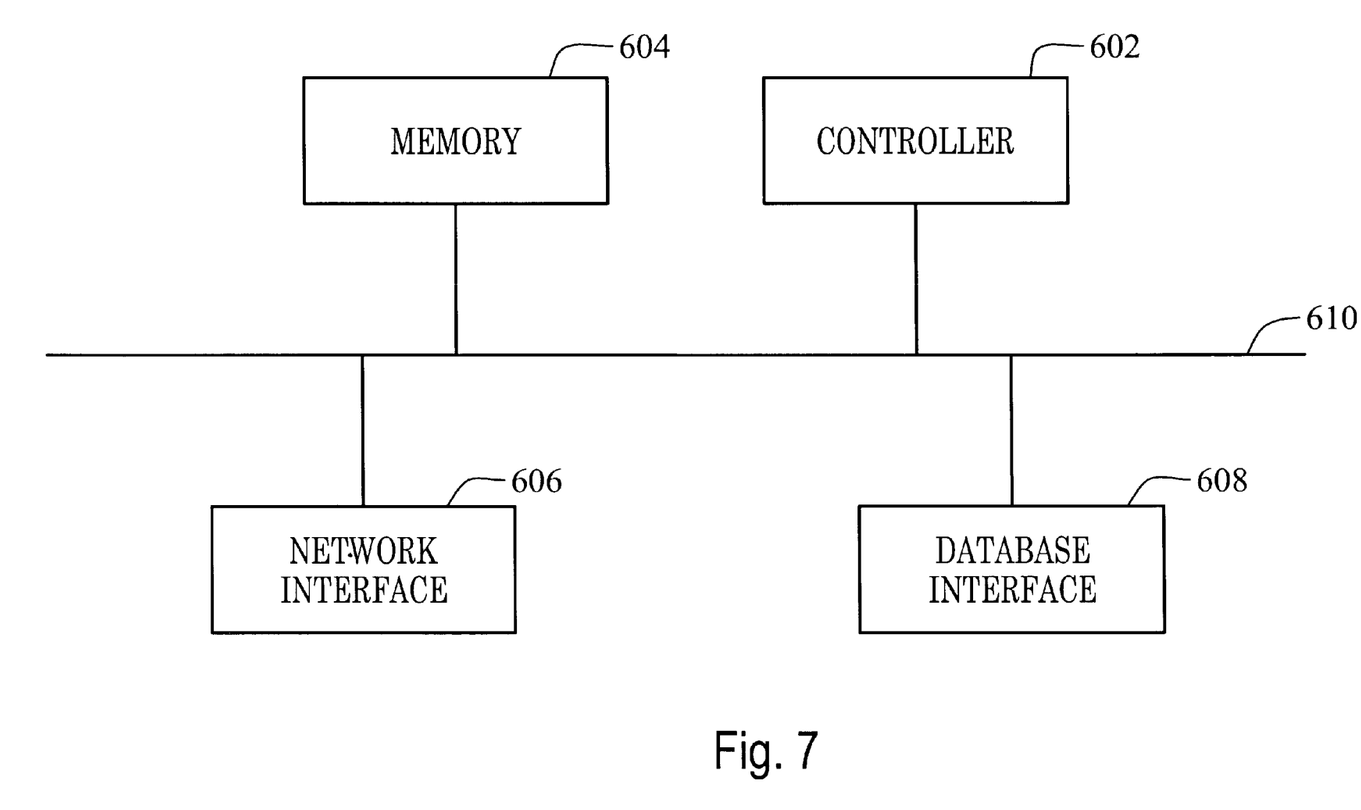
FIG. 7 is an exemplary block diagram of a queue sharing.

FIG. 7 shows an exemplary block diagram of the queue sharing apparatus 300 which may include a controller 602, a memory 604, a network interface 606 and a database interface 608. The above components may be coupled together via a signal bus 610. While the queue sharing apparatus 300 is shown to have a bus architecture, other types of architectures may also be possible as is well known to one of ordinary skilled in the art. In addition, the complete function of the queue sharing apparatus 300 may be implemented as a program within any of the processors which may be included in the network unit 202.

For simplicity of discussion, the queue sharing apparatus 300 is described assuming that data packets received via the network interface 606 are properly placed in the high, medium and low class queues corresponding to each of the links 209–215. The following description of the queue sharing apparatus 300 focuses on the output function of the input device 302.

The high, medium and low class queues 308–304 may be implemented as stacks stored in either the memory 604 or a database that is accessible via the database interface 608. Thus, when placed into a queue, the new data packet may be simply pushed into a corresponding stack. When outputting from a queue, the data packet is simply popped from the corresponding stack.

When a new data packet for one of the class queues is received, the controller 602 determines whether the associated queue is full. If not full, the controller 602 places the new data packet into the queue. If full, the controller 602 attempts to identify another non-full queue. For example, the controller 602 may start with the lowest class queue and work upwards toward higher class queues if the lower class queues are full. The controller 602 may also implement more sophisticated schemes such as identifying a non-full queue based on historical data packet volumes, as described above.

If a non-full queue is identified, the controller 602 places the overflow data packet into the identified queue. If a non-full queue is not available (i.e., all the queues are full relative to its respective buffer threshold), then the controller 602 may drop the overflow data packet (i.e., delete the overflow data packet). Instead of dropping the overflow data packet, the controller 602 may also place the data packet in a queue that exceeds the respective buffer threshold and accept the risk that the bandwidth of the affected class maybe lower than the specified bandwidth.

A capacity of the network 102 is exceeded when either a data packet is dropped or one of the specified bandwidths is not achieved. Under such conditions, a flag may be set by the controller 602 so that additional network resources may be added to accommodate the increased traffic volume.

Figure 8:
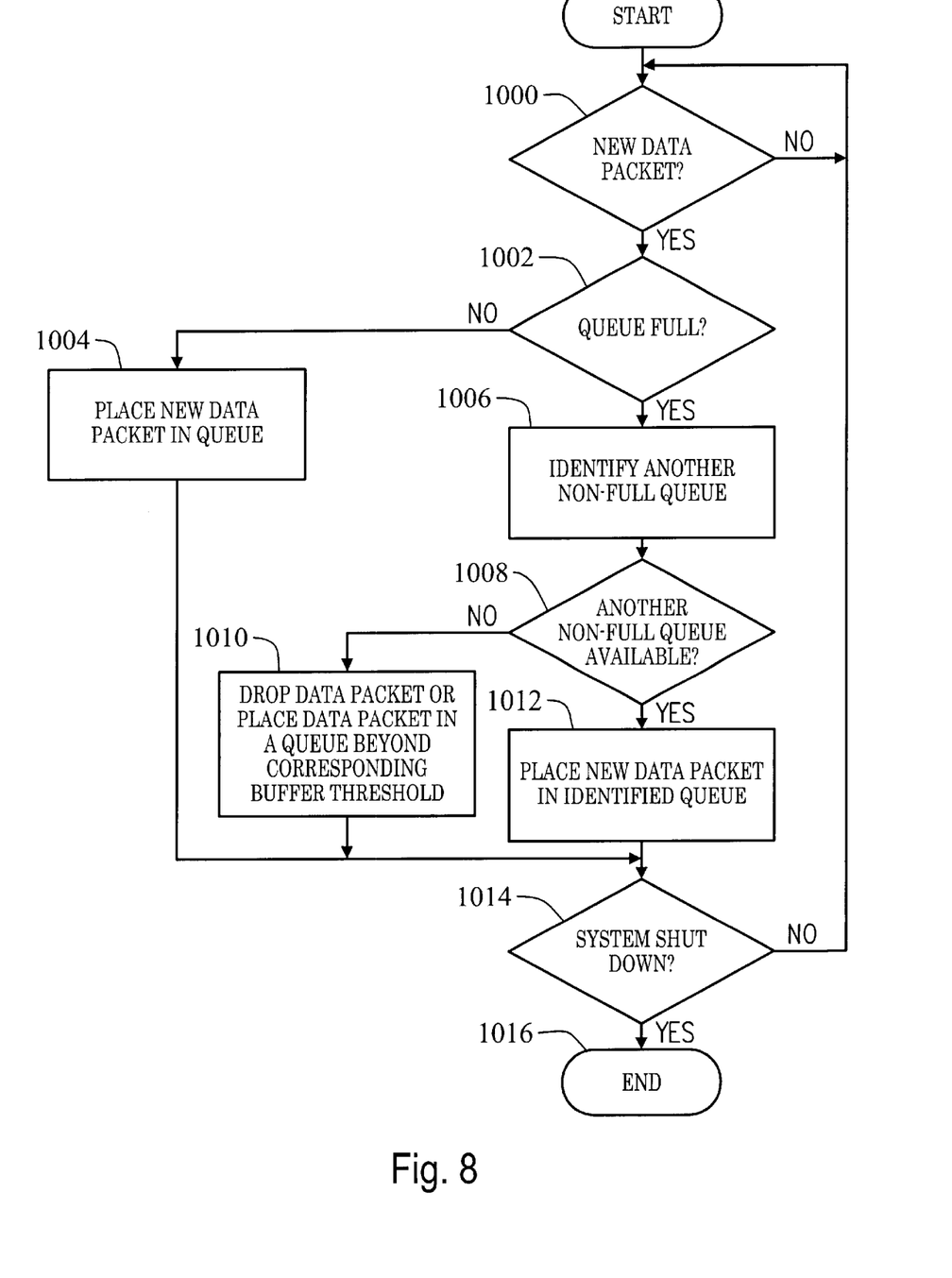
FIG. 8 is an exemplary flowchart for a queue sharing process.

FIG. 8 shows a flow chart of a process of the queue sharing apparatus 300. In step 1000, the controller 602 monitors for new data packets. If new data packets are not received, the controller 602 returns to step 1000; otherwise, the controller 602 goes to step 1002. In step 1002, the controller 602 determines whether the queue that should received the new data packet is full. If full, the new data packet becomes an overflow data packet and the controller 602 goes to step 1006; otherwise, the controller 602 goes to step 1004. In step 1004, the controller 602 places the new data packet in the queue and goes to step 1014.

In step 1006, the controller 602 identifies another non-full queue and goes to step 1008. In step 1008, the controller 602 determines whether a non-full queue is available (i.e., whether the buffer threshold associated with the class of the overflow data packet has been exceeded). If available, the controller 602 goes to step 1012; otherwise, the controller 602 goes to step 1010. In step 1010, the controller 602 either drops the data packet or places the data packet in a queue beyond the corresponding buffer threshold and goes to step 1014. In step 1012, the controller 602 places the new data packet in the identified queue and goes to step 1014. In step 1014, the controller 602 determines whether the queue sharing apparatus 300 is to be shut down. If the queue sharing apparatus 300 is to shut down, the controller 602 goes to step 1016 and ends the process; otherwise, the controller 602 returns to step 1000.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. A method for operating a plurality of queues of a port, comprising:

ordering the queues based on a plurality of classes, the classes ranging from low to high;

generating a threshold for each of the queues that corresponds to a performance assigned to each of the queues; and generating corresponding thresholds for each of the queues that corresponds to one or more classes higher than a class of each of the queues;

setting one or more queue full conditions for each of the queues when a performance of each of the queue cannot be met based on corresponding one or more thresholds, wherein a queue is full when a corresponding full condition is set;

receiving data destined for a first queue of the queues;

placing the data in the first queue if the first queue is not full; and placing the data in a second queue of the queues if the first queue is full.

2. The method of claim 1, further comprising;

placing the data in a third queue of the queues if the first queue is full and the third queue is not full;

and placing the data in the second queue if the third queue is full.

3. The method of claim 1, wherein the performance is based on one or more performance parameters including bandwidth, end-to-end delay, head packet delay, tail packet delay and intermediate packet delay.

4. The method of claim 2, further comprising:

setting a queue full condition for the third queue if a performance of the third queue cannot meet a threshold that corresponds to a class of the first queue and if the class of the first queue is higher than a class of the third queue; and setting the queue full condition for the third queue if the performance of the third queue cannot meet a threshold that corresponds to the class of the third queue and if the class of the first queue is lower than the class of the third queue.

5. The method of claim 1, wherein the generating a threshold step comprises setting the threshold to a buffer threshold which is inversely proportional to an effective bandwidth of a class corresponding to each of the queues.

6. The method of claim 1, wherein the generating corresponding thresholds step comprises setting each of the thresholds to a buffer threshold, that corresponds to a higher class than the class of the queue, to be proportional to a ratio of an effective bandwidth corresponding to each of the queues divided by an effective bandwidth corresponding to the higher class.

7. The method of claim 1, wherein the data is deleted and not stored in the second queue.

8. The method of claim 1, wherein the data is in the form of data packets and each of the data packets is processed through the queues separately.

9. An apparatus that includes a plurality of queues of a port, comprising:

a memory for storing the queues; and a controller coupled to the memory, the controller ordering the queues based on a plurality of classes, the classes ranging from low to high, generating a threshold for each of the queues that corresponds to a performance assigned to each of the queues, and generating corresponding thresholds for each of the queues that corresponds to one or more classes higher than a class of each of the queues;

wherein the controller sets one or more queue full conditions for each of the queues when a performance of each of the queue cannot meet corresponding one or more thresholds, a queue being full when a corresponding full condition is set, receives data destined for a first queue of the queues, places the data in the first queue if the first queue is not full, and places the data in a second queue of the queues if the first queue is full.

10. The apparatus of claim 9, wherein the controller places the data in a third queue of the queues if the first queue is full and the third queue is not full, and places the data in the second queue if the third queue is full.

11. The apparatus of claim 9, wherein the performance is based on one or more performance parameters including bandwidth, end-to-end delay, head packet delay, tail packet delay and intermediate packet delay.

12. The apparatus of claim 10, wherein the controller sets a queue full condition for the third queue if a performance of the third queue cannot meet a threshold that corresponds to a class of the first queue and if the class of the first queue is higher than a class of the third queue, and sets the queue full condition for the third queue if the performance of the third queue cannot meet a threshold that corresponds to the class of the third queue and if the class of the first queue is lower than the class of the third queue.

13. The apparatus of claim 9, wherein the controller sets the threshold to a buffer threshold that is inversely proportional to a weight assigned to each of the queues.

14. The apparatus of claim 9, wherein the controller sets each of the thresholds to a buffer threshold, that corresponds to a higher class than the class of the queue, to be proportional to a weight assigned to the higher class divided by a weight assigned to each of the queues.

15. The apparatus of claim 9, wherein the data is deleted and not stored in the second queue.

16. The apparatus of claim 9, wherein the data is in the form of data packets and each of the data packets is processed through the queues separately.

* * * * *